US011009325B1

(12) United States Patent
Prewitt et al.

(10) Patent No.: US 11,009,325 B1
(45) Date of Patent: May 18, 2021

(54) SYSTEM AND METHOD FOR TESTING MISSILE COMPONENTS

(71) Applicant: HONEYWELL FEDERAL MANUFACTURING & TECHNOLOGIES, LLC, Kansas City, MO (US)

(72) Inventors: Steven Forrest Prewitt, Kansas City, MO (US); Michael Neal Rector, Kansas City, MO (US); John Michael Fines, Kansas City, MO (US); Charles Geoffrey Haning, Kansas City, MO (US); Evan Andrew Kontras, Kansas City, MO (US)

(73) Assignee: Honeywell Federal Manufacturing & Technologies, LLC, Kansas City, MO (US)

( * ) Notice: Subject to any disclaimer, the term of this patent is extended or adjusted under 35 U.S.C. 154(b) by 545 days.

(21) Appl. No.: 15/893,095

(22) Filed: Feb. 9, 2018

(51) Int. Cl.
*F42B 15/10* (2006.01)
*G01L 5/14* (2006.01)
*F42B 35/00* (2006.01)

(52) U.S. Cl.
CPC .............. *F42B 15/10* (2013.01); *F42B 35/00* (2013.01); *G01L 5/14* (2013.01)

(58) Field of Classification Search
CPC ........ F42B 35/00; F42B 15/08; F42B 30/006; F42B 12/365; F42B 6/04; F42B 6/06; F42B 10/46; F42B 12/362; F42B 15/01; F42B 15/22; F42B 19/005; F42B 19/46; F42B 12/208; F42B 12/24; F42B 12/385;
(Continued)

(56) References Cited

U.S. PATENT DOCUMENTS 2,815,584 A * 12/1957 Watson ................ H02K 5/1737
73/504.11
3,597,969 A 8/1971 Curchack
(Continued)

OTHER PUBLICATIONS

"Three-Axis Motion Simulator BD357-TCG" Acutronic. 2011.
(Continued)

*Primary Examiner* — Andre J Allen
(74) *Attorney, Agent, or Firm* — Hovey Williams LLP

(57) ABSTRACT

A testing system for testing a missile component having a sense axis includes a centrifuge, a support arm, an orientation assembly, and a controller. The centrifuge rotates the orientation assembly about a vertical axis in a substantially horizontal plane. The orientation assembly includes a first motor, a first gimbal, and a gimballed support. The first motor has a first rotatable shaft defining a first gimbal axis. The first gimbal is coupled with the first rotatable shaft to rotate about the first gimbal axis while the centrifuge rotates the orientation assembly about the vertical axis such that missile component is simultaneously rotated about both the vertical axis and the first gimbal axis to simulate a missile launch of the missile component. The gimballed support is coupled with the first gimbal for supporting the missile component such that the sense axis of the missile component is not parallel to the substantially horizontal plane. The orientation assembly may also include a second gimbal that is rotated about a second gimbals axis by a second motor.

20 Claims, 7 Drawing Sheets

(58) Field of Classification Search
CPC .......... F42B 12/54; F42B 12/60; F42B 35/02;
F42B 6/08; F42B 8/28; G01P 3/665;
G01P 15/0888; G01P 5/12; G01P 1/023;
G01P 1/127; G01P 3/44; G01P 3/487;
G01P 3/66; G01P 3/685; G01P 7/00
USPC .......................................................... 73/167
See application file for complete search history.

(56) References Cited

U.S. PATENT DOCUMENTS

| | | | |
|---|---|---|---|
| 3,613,655 A * | 10/1971 | Tobin | F41B 3/04 |
| | | | 124/6 |
| 3,745,832 A | 7/1973 | Johnson | |
| 3,845,665 A | 11/1974 | Capetta et al. | |
| 4,710,128 A | 12/1987 | Wachsmuth et al. | |
| 4,751,662 A | 6/1988 | Crosbie | |
| 5,021,982 A | 6/1991 | Crosbie et al. | |
| 2014/0087334 A1 | 3/2014 | Schlusselberger | |

OTHER PUBLICATIONS

"Test Systems—Electra-Optics (Optronics)" Aerotech. Advanced Motion Systems for Defense, Aerospace, and National Security.
Ou et al. "The design of the 3-axial centrifuge" IEEE Explore. Jul. 21, 2013.
Silver, Marvin. "Optimum filtering techniques applied to centrifuge testing of missile inertial platforms" American Institute of Aeronautics and Astronautics. 1970.
"Centrifuge Test Procedures" U.S. Army Test and Evaluation Command Common Engineering Test Procedure. Feb. 29, 1968.

* cited by examiner

SYSTEM AND METHOD FOR TESTING MISSILE COMPONENTS

STATEMENT REGARDING FEDERALLY-SPONSORED RESEARCH OR DEVELOPMENT

This invention was made with Government support under Contract No.: DE-NA-0002839 awarded by the United States Department of Energy/National Nuclear Security Administration. The Government has certain rights in the invention.

FIELD

The present invention relates to systems and methods for testing missile components, and more particularly, embodiments concern a system and method for reorienting a sense axis of a missile component to simulate missile launch.

BACKGROUND

Missile components such as accelerometers must be tested to ensure they can withstand the forces of a missile launch and accurately measure or monitor aspects of the launch. Typically, these components are tested with centrifuges or other centripetal acceleration testing devices. Prior art testing techniques are often inaccurate because they impose side-loading on a tested missile component, which is uncharacteristic of a true missile launch.

This background discussion is intended to provide information related to the present invention which is not necessarily prior art.

SUMMARY

The present invention solves the above-described and other problems and limitations by providing a system and method for more accurately testing missile components by reorienting a sense axis of a missile component to mitigate uncharacteristic side-loading on the missile component.

One embodiment of the invention is a testing system broadly comprising a centrifuge, a support arm, an orientation assembly, and a controller. The centrifuge has a centrifuge shaft and a centrifuge motor for rotating the centrifuge shaft about a vertical axis. The centrifuge may be a fixed-angle centrifuge, swinging head centrifuge, continuous tubular centrifuge, laboratory centrifuge, analytical ultracentrifuge, haematocrit centrifuge, gas centrifuge, or any other type of centrifuge. The centrifuge may also be an industrial centrifuge, such as a filtration centrifuge or sedimentation centrifuge.

The support arm is coupled with the centrifuge shaft and has a longitudinal axis that is generally perpendicular to the vertical axis of the centrifuge shaft such that the support arm rotates in a substantially horizontal plane about the centrifuge shaft.

The orientation assembly is mounted on or near an end of the support arm and comprises a housing, a first motor, an outer gimbal, a second motor, an inner gimbal, a gimballed support, an electrical interface, a first resolver, and a second resolver.

An embodiment of the housing is fixedly coupled to a distal end of the support arm and has a floor, an upright wall, and a ceiling.

The first motor is mounted to the floor and has a first rotatable shaft defining a yaw axis that is parallel to the vertical axis of the centrifuge shaft. The outer gimbal is coupled with the first rotatable shaft so as to rotate about the yaw axis.

The second motor is mounted to the outer gimbal and has a second rotatable shaft defining a pitch axis that is perpendicular to both the vertical axis of the centrifuge shaft and the longitudinal axis of the support arm. The inner gimbal is coupled with the second rotatable shaft so as to rotate about the pitch axis.

The gimballed support supports the missile component such that the sense axis of the missile component is substantially parallel to the vertical axis. An embodiment of the gimballed support is attached to or integrated with the inner gimbal. The electrical interface assembly is positioned on or near the gimballed support and electrically connects with the missile component.

The first resolver is mounted on the ceiling of the housing and is coupled with the outer gimbal for measuring a first degree of rotation of the outer gimbal. The second resolver is mounted on the outer gimbal and is coupled with the inner gimbal for measuring a second degree of rotation of the inner gimbal.

The controller communicates with the centrifuge motor, the first motor, the second motor, the electrical interface assembly, the first resolver, and the second resolver and is configured to simultaneously operate the centrifuge motor, the first motor, and the second motor such that the missile component is simultaneously rotated about the vertical axis of the centrifuge shaft, the yaw axis, and the pitch axis so as to simulate a missile launch of the missile component. The controller is also configured to recreate a missile acceleration profile to increase and decrease a rate of rotation of the centrifuge shaft so as to simulate a missile launch of the missile component. The controller is configured to reorient the missile component by operating the first and second motors such that the sense axis of the missile component will align with a vector sum of acceleration vectors experienced by the missile component while the missile component is rotated about the vertical axis of the centrifuge shaft, the acceleration vectors including centripetal acceleration, tangential acceleration, and gravitational acceleration.

Another embodiment of the invention is a method for testing a missile component having a sense axis. The method comprises the step of coupling an orientation assembly to a support arm and coupling the support arm with a centrifuge shaft that rotates about a vertical axis. The method further comprises the step of mounting the missile component to a gimballed support of the orientation assembly such that the sense axis of the missile component is not perpendicular to the vertical axis. The method also comprises the step of operating the centrifuge shaft to rotate the support arm in a substantially horizontal plane about the centrifuge shaft. Additionally, the method comprises the step of rotating the gimballed support about a first gimbal axis that is not parallel to the longitudinal axis of the support arm to simulate a missile launch of the missile component.

This summary is not intended to identify essential features of the present invention, and is not intended to be used to limit the scope of the claims. These and other aspects of the present invention are described below in greater detail.

DRAWINGS

Embodiments of the present invention are described in detail below with reference to the attached drawing figures, wherein.

The figures are not intended to limit the present invention to the specific embodiments they depict. The drawings are not necessarily to scale.

DETAILED DESCRIPTION

The following detailed description of embodiments of the invention references the accompanying figures. The embodiments are intended to describe aspects of the invention in sufficient detail to enable those with ordinary skill in the art to practice the invention. Other embodiments may be utilized and changes may be made without departing from the scope of the claims. The following description is, therefore, not limiting. The scope of the present invention is defined only by the appended claims, along with the full scope of equivalents to which such claims are entitled.

In this description, references to "one embodiment", "an embodiment", or "embodiments" mean that the feature or features referred to are included in at least one embodiment of the invention. Separate references to "one embodiment", "an embodiment", or "embodiments" in this description do not necessarily refer to the same embodiment and are not mutually exclusive unless so stated. Specifically, a feature, structure, act, etc. described in one embodiment may also be included in other embodiments, but is not necessarily included. Thus, particular implementations of the present invention can include a variety of combinations and/or integrations of the embodiments described herein.

Figure 1:
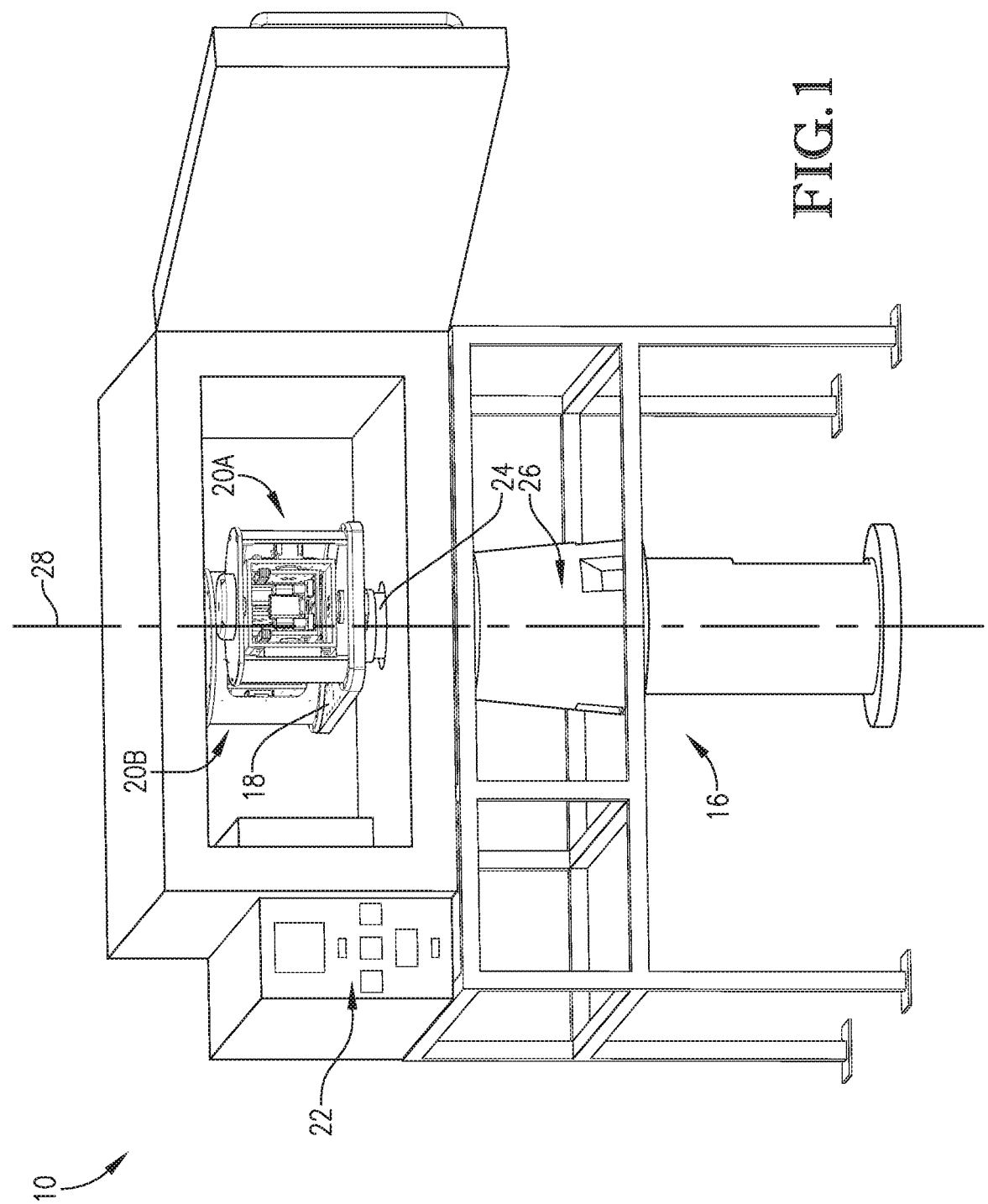
FIG. 1 is a perspective view of an embodiment of a testing system for testing a missile component having a sense axis.

A testing system 10 constructed in accordance with embodiments of the present invention for testing a missile component 12 is shown in FIG. 1.

Figure 2:
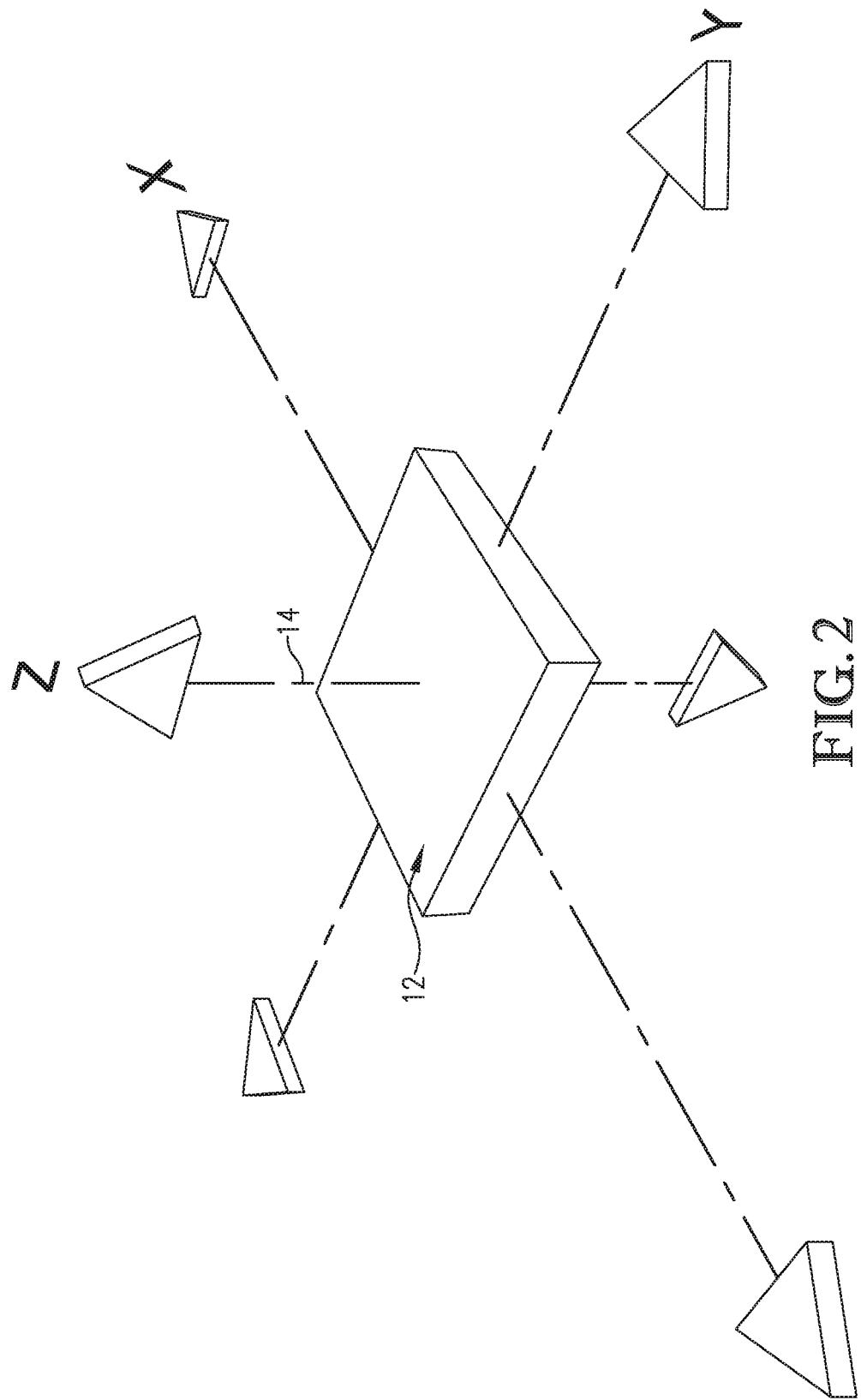
FIG. 2 is a schematic view of an exemplary missile component that may be tested with the testing system of FIG. 1.

The tested missile component 12 may be an accelerometer, such as a launch accelerometer or a three-axis microelectromechanical system (MEMS) accelerometer. The missile component 12 may also be an inertial switch, a safing device, a safing switch, an inertial measurement unit (IMU) package, or any other component used in a missile. As shown in FIG. 2, the missile component 12 may include a sense axis 14 that may be an axis in which the missile component 12 measures acceleration. The missile component may also measure a missile's specific force, angular rate, and/or the magnetic field surrounding the missile. For example, if the missile component 12 includes sensing elements, such as a spring, a mass, and a piezoelectric material all aligned in the z-axis, then the sense axis 14 for this missile component 12 will measure acceleration in the z-axis. Likewise, the accelerometer may include a spring and capacitive plates aligned for sensing acceleration along the sense axis 14.

Returning to FIG. 1, an embodiment of the testing system 10 broadly comprises a centrifuge 16, a support arm 18, at least one orientation assembly 20A, and a controller 22. The testing system 10 may also include other conventional components such as display screens, input devices, power sources, etc. that will not be described in detail herein.

The centrifuge 16 includes a centrifuge shaft 24 and a centrifuge motor 26 for rotating the centrifuge shaft 24 about a vertical axis 28. The centrifuge 16 may be a fixed-angle centrifuge, swinging head centrifuge, continuous tubular centrifuge, laboratory centrifuge, analytical ultracentrifuge, haematocrit centrifuge, gas centrifuge, or any other type of centrifuge. In some embodiments, the centrifuge 16 may be an industrial centrifuge, such as a filtration centrifuge or sedimentation centrifuge. Specifically, the centrifuge 16 may be an Acutronic/Carco Model 800.

The centrifuge motor 26 rotates the centrifuge shaft 24 about the vertical axis 28. The centrifuge motor 26 may be a self-commutated motor, such as a mechanical commutator motor or electronic commutator motor. Additionally, the centrifuge motor 26 may be an externally commutated motor, such as an asynchronous machine or synchronous machine. The centrifuge motor 26 may also be a direct current (DC) motor, an alternating current (AC) motor, a servomotor, a stepper motor, a hydraulic motor, and the like. Any suitable motor may be used to rotate the centrifuge shaft 24.

The support arm 18 is coupled with and rotated by the centrifuge shaft 24. In some embodiments, the support arm 18 is fixedly coupled with the centrifuge shaft 24, while in other embodiments the support arm 18 is rotatably coupled with the centrifuge shaft 24. For embodiments in which the support arm 18 is rotatably coupled, the support arm 18 may rotate in one, two, or three or more axes relative to the centrifuge shaft 24. The support arm 18 may be centered on the centrifuge shaft 24 as shown in FIG. 3 or may be offset.

Figure 3:
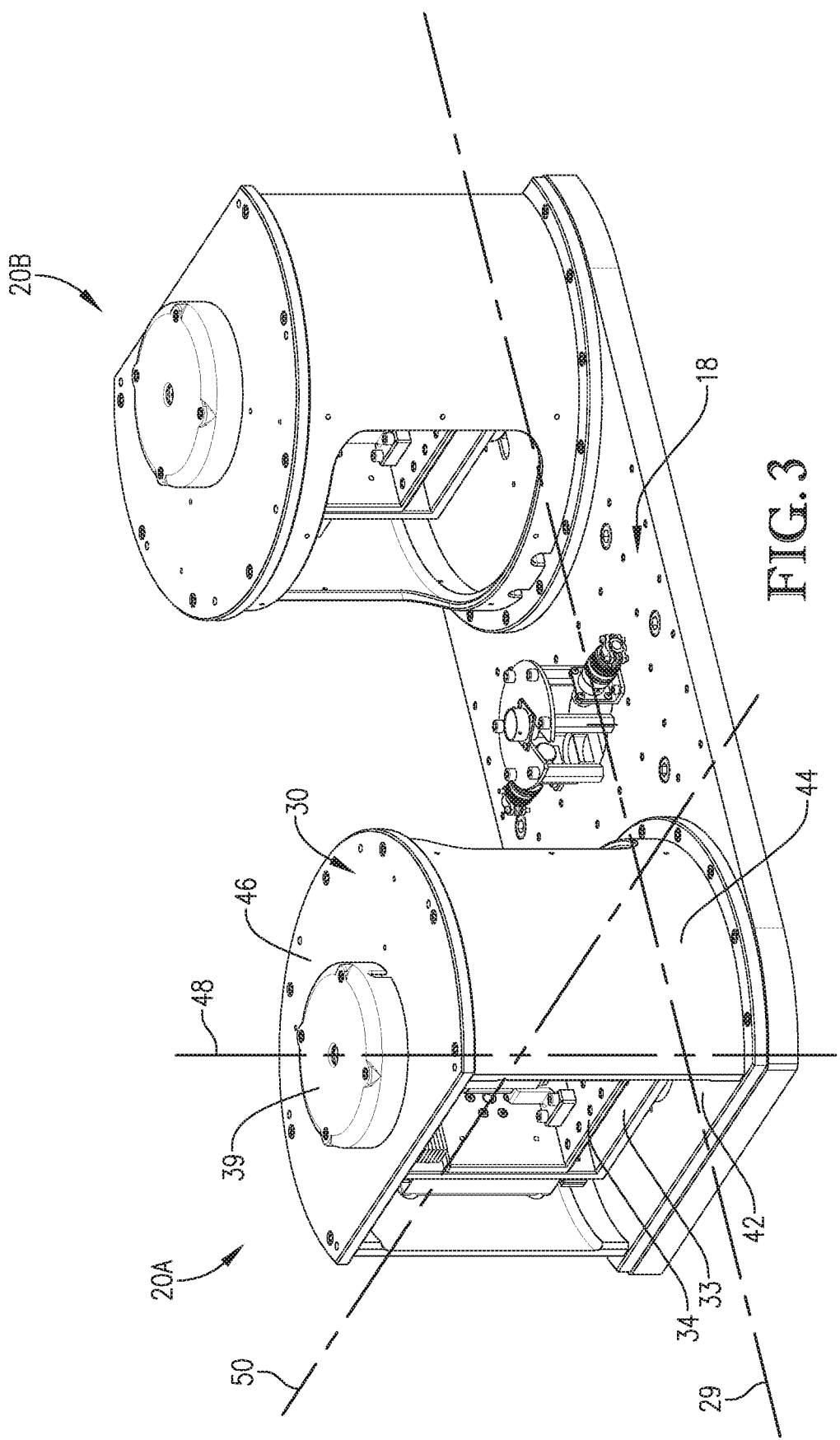
FIG. 3 is an isometric view of an orientation assembly coupled to a support arm of the testing system in FIG. 1.
Figure 4:
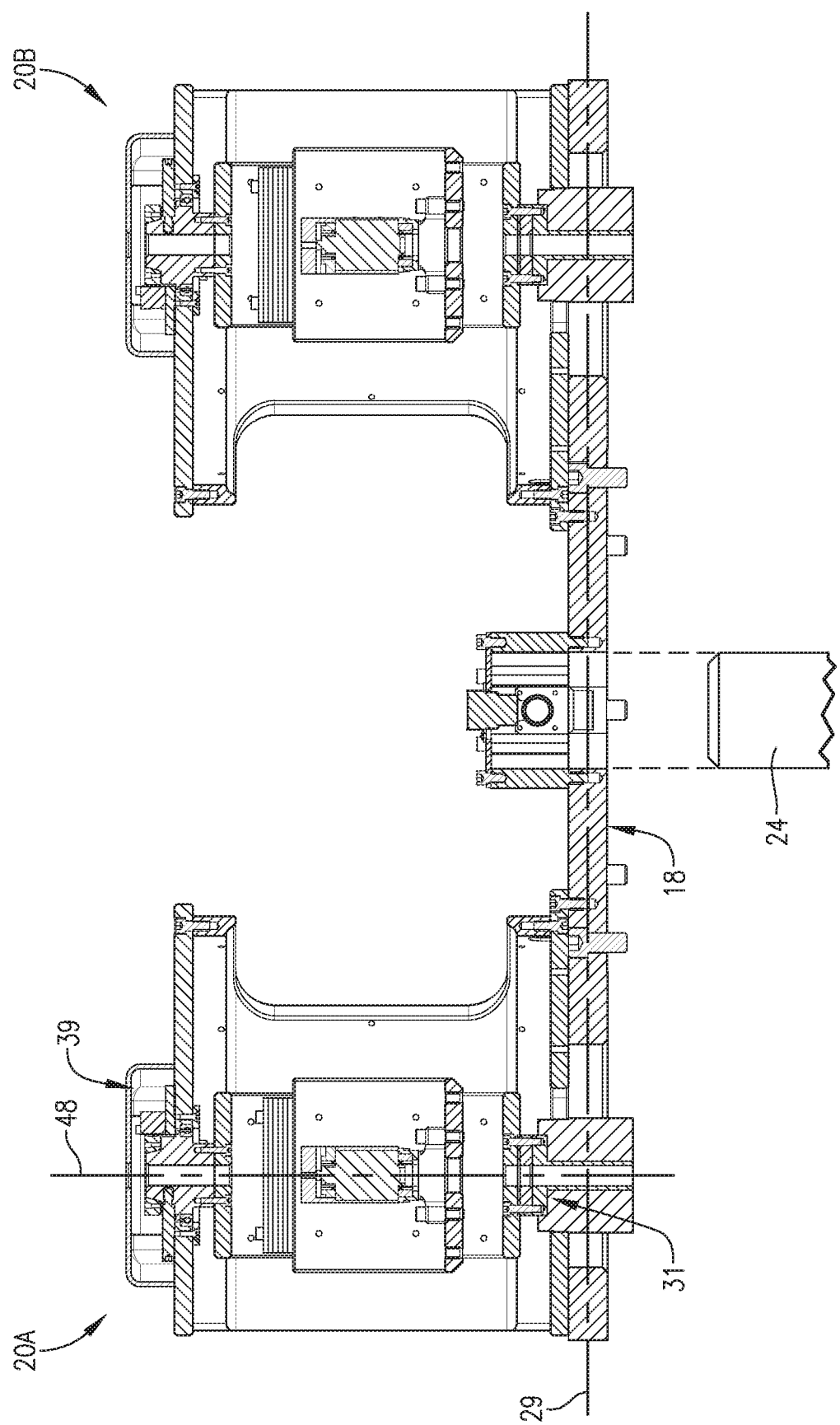
FIG. 4 is a vertical side cross section view of the orientation assembly of the testing system.
Figure 5:
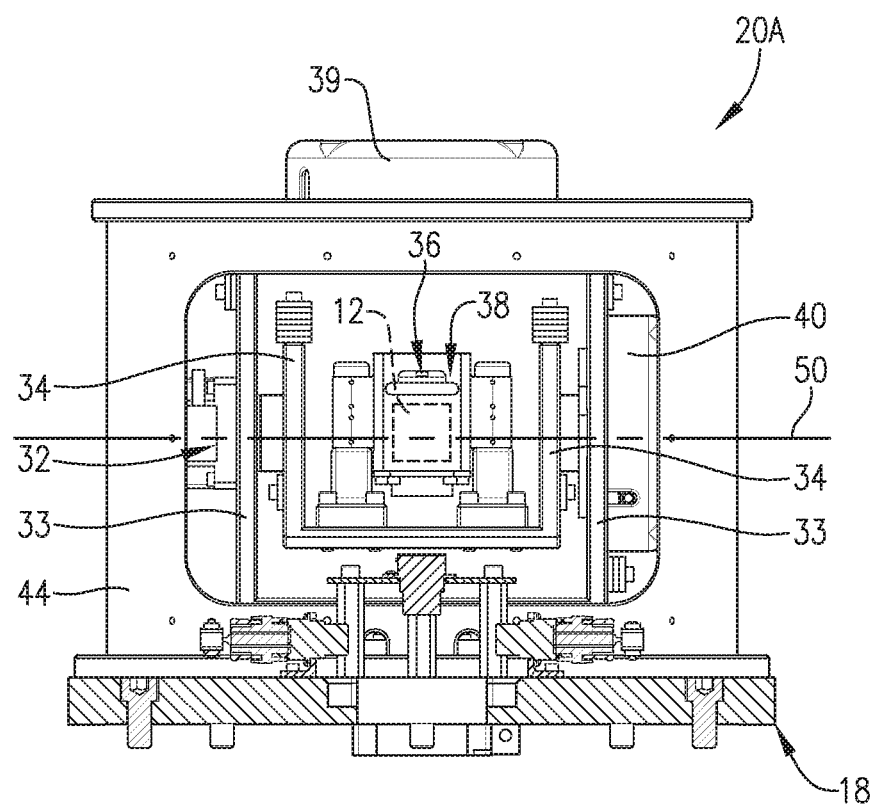
FIG. 5 is a front elevation view of the orientation assembly in FIG. 3.

A particular embodiment of the support arm 18 is shown in FIGS. 3-5. The support arm 18 has a longitudinal axis 29 that is generally perpendicular to the vertical axis 28 of the centrifuge shaft 24 such that the support arm 18 rotates in a substantially horizontal plane about the centrifuge shaft 24. The support arm 18 may be any suitable support, e.g., a beam, a boom assembly, a table, a rail, a platform, and the like and may be made of metal or any other materials.

The orientation assembly 20A is coupled to the support arm 18 and may include a housing 30, a first gimbal motor 31, a second gimbal motor 32, a first gimbal 33, a second gimbal 34, a gimballed support 36, an electrical interface assembly 38, a first resolver 39, and a second resolver 40. As shown in FIG. 3, two orientation assemblies 20A and 20B may be coupled to opposite ends of the support arm 18, but only the orientation assembly 20A will be described in detail.

The housing 30 may be any suitable structure for coupling with and supporting the first gimbal motor 31, the second gimbal motor 32, the first gimbal 33, the second gimbal 34, the gimballed support 36, the electrical interface assembly 38, the first resolver 39, and/or the second resolver 40. One embodiment of the housing 30 has a floor 42, an upright wall 44, and a ceiling 46 and is fixedly coupled to the support arm 18. In some embodiments, the housing 30 is coupled to a distal end of the support arm 18, as shown in FIG. 3.

The first and second gimbal motors 31 and 32 each have a rotatable shaft that rotates about a gimbal axis. The first motor 31 may be mounted to the floor 42 of the housing 30 and has a first rotatable shaft defining a first gimbal axis 48 that is not parallel to the longitudinal axis 29 of the support arm 18. The first gimbal axis 48 may be a yaw axis that is parallel to the vertical axis 28 of the centrifuge shaft 24. The second motor 32 may be mounted to the first gimbal 33 and may have a second rotatable shaft defining a second gimbal axis 50 that is not parallel to the vertical axis 28 of the centrifuge shaft 24. The second gimbal axis 50 may be a pitch axis that is perpendicular to both the vertical axis 28 of the centrifuge shaft 24 and the longitudinal axis 29 of the support arm 18.

The first and second gimbal motors 31 and 32 may be self-commutated motors, such as mechanical commutator motors or electronic commutator motors. Additionally, the gimbal motors 31 and 32 may be externally commutated motors, such as asynchronous machines or synchronous machines. The gimbal motors 31 and 32 may also be direct current (DC) motors, alternating current (AC) motors, servomotors, stepper motors, hydraulic motors, and the like. Any suitable motor may be used to rotate the rotatable shaft of the gimbal motors 31 and 32.

The first and second gimbals 33 and 34 rotate about the above-described gimbal axes and may be coupled with the support arm 18, the housing 30, the rotatable shaft of the gimbal motor 32, and/or other gimbals 34. For example, in one embodiment, the first gimbal 33 is coupled with the first rotatable shaft so as to rotate about the first gimbal axis 48. Likewise, the second gimbal 34 is coupled with the second rotatable shaft so as to rotate about the second gimbal axis 50. The gimbals 33 and 34 may be U-shaped, ring-shaped, rectangular-shaped, or any other shape suitable for being rotated about the gimbal axes. In one embodiment, the first gimbal 33 may be a rectangular-shaped outer gimbal, and the second gimbal 34 be a U-shaped inner gimbal positioned inside and coupled with the outer gimbal.

Although an embodiment of the invention includes first and second gimbal motors and first and second gimbals, other embodiments may include only one gimbal motor and one gimbal or more than two of each.

The gimballed support 36 supports the tested missile component 12 and may be on the first gimbal 33 or the second gimbal 34. The gimballed support supports the missile component 12 such that the sense axis 14 of the missile component 12 is not parallel to the horizontal plane in which the support arm 18 rotates. In other embodiments, the gimballed support 36 supports the missile component 12 such that the sense axis 14 of the missile component 12 is substantially parallel to the vertical axis 28. The gimballed support 36 may support the missile component 12 such that the sense axis 14 is neither parallel to the vertical axis 28 nor the horizontal plane in which the support arm 18 rotates. For example, the sense axis 14 may be oriented within one, two, three, four, five, ten, fifteen, twenty and/or forty-five degrees of being parallel to the vertical axis 28 or the horizontal plane in which the support arm 18 rotates. The gimballed support 36 may be a platform, a table, a carriage, a container, or any structure for supporting the missile component 12. For example, the gimballed support 36 may be a container and the missile component 12 may be supported inside the container. The gimballed support 36 may even be a surface of the first gimbal 33 and/or second gimbal 34.

The electrical interface assembly 38 electrically connects the missile component 12 with the controller 22 so the controller 22 may analyze information and electrical signals received from the missile component 12. The electrical interface assembly 38 is positioned on and/or inside the gimballed support 36 and electrically connects with the missile component 12. For example, the missile component 12 may communicate information about the operation of the missile component 12 and/or information about measurements recorded by the missile component 12.

The resolvers 39 and 40 measure a degree of rotation of the gimbals 33 and 34 and/or measure the degree of rotation of the rotatable shaft of the gimbal motors 31 and 32. The first resolver 39 and second resolver 40 may be mounted to the first gimbal 33, the second gimbal 34, the floor 42, the upright wall 44, and/or the ceiling 46. In one embodiment, the first resolver 39 is mounted on the ceiling 46 and coupled with the first gimbal 33 for measuring a first degree of rotation of the first gimbal 33, and the second resolver is mounted on the first gimbal 33 and coupled with the second gimbal 34 for measuring a second degree of rotation of the second gimbal 34.

Figure 7:
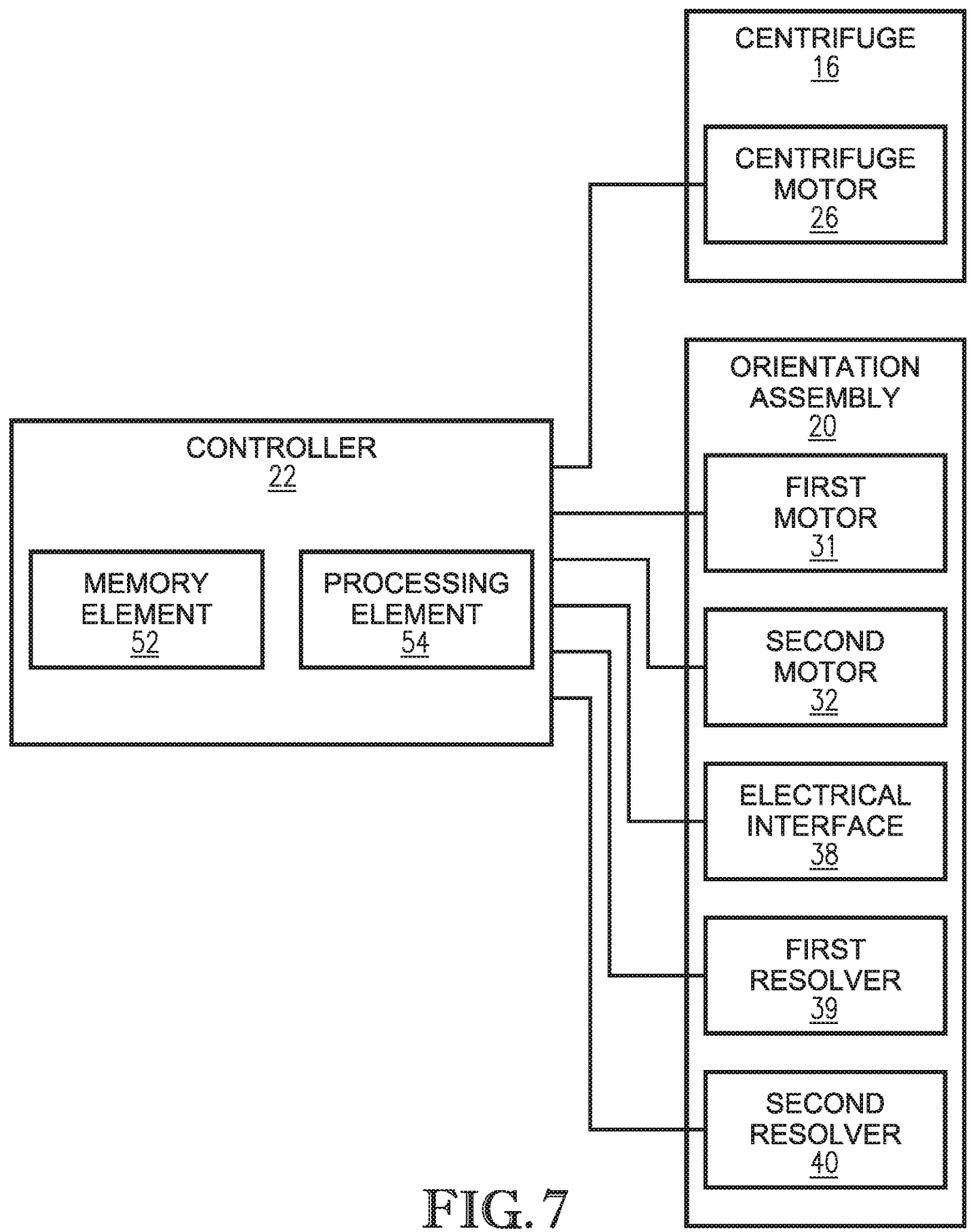
FIG. 7 is a block diagram of an embodiment of the testing system in FIG. 1.

Referring to FIG. 7, an embodiment of the controller 22 communicates with and/or controls operation of the centrifuge motor 26, the first gimbal motor 31, the second gimbal motor 32, the electrical interface assembly 38, the first resolver 39, and/or the second resolver 40 so as to simulate a missile launch. The controller 22 may include an electronic memory element 52 and an electronic processing element 54. The controller 22 may be integrated with the testing system 10, or the controller 22 may be an external component, such as a personal computer, that is in communication with the testing system 10.

In some embodiments, the controller 22 is configured to simultaneously operate the centrifuge motor 26, the first gimbal motor 31, and the second gimbal motor 32. For example, the controller 22 may simultaneously operate the centrifuge motor 26, first gimbal motor 31 and/or the second gimbal motor 32 such that the missile component 12 is simultaneously rotated about the vertical axis 28 of the centrifuge shaft 24, the first gimbal axis 48, and/or the second gimbal axis 50 so as to simulate a missile launch of the missile component 12.

In various embodiments, the controller 22 may be configured to recreate a missile acceleration profile to increase and decrease rate of rotation of the centrifuge shaft 24 so as to simulate a missile launch of the missile component 12. In some embodiments, the controller 22 may be configured to reorient the missile component 12 by operating the first gimbal motor 31 and/or second gimbal motor 32 such that the sense axis 14 of the missile component 12 aligns parallel with a vector sum of acceleration vectors experienced by the missile component 12 while the missile component 12 is rotated about the vertical axis 28 of the centrifuge shaft 24. The vector sum of acceleration vectors experienced by the missile component 12 may include a vector sum of tangential acceleration, centripetal acceleration, and/or gravitational acceleration. For example, the controller 22 may cause the first gimbal motor 31 to rotate the first gimbal 33 in a first gimbal axis 48, and the controller 22 may cause the second gimbal motor 32 to rotate the second gimbal 34 in the second gimbal axis 50.

The electronic memory element 52 may include electronic hardware data storage components such as read-only memory (ROM), programmable ROM, erasable programmable ROM, random-access memory (RAM) such as static RAM (SRAM) or dynamic RAM (DRAM), cache memory, hard disks, floppy disks, optical disks, flash memory, thumb drives, universal serial bus (USB) drives, or the like, or combinations thereof. In some embodiments, the memory element 52 may be embedded in, or packaged in the same package as, the processing element. The memory element 52 may include, or may constitute, a "computer-readable medium". The memory element 52 may store the instructions, code, code segments, software, firmware, programs, applications, apps, services, daemons, or the like that are executed by the processing element. The memory element 52 may also store settings, data, documents, sound files, photographs, movies, images, databases, and the like.

The electronic processing element 54 may include electronic hardware components such as processors, microprocessors (single-core and multi-core), microcontrollers, digital signal processors (DSPs), field-programmable gate arrays (FPGAs), analog and/or digital application-specific integrated circuits (ASICs), or the like, or combinations thereof. The processing element 54 may generally execute, process, or run instructions, code, code segments, software, firmware, programs, applications, apps, processes, services, daemons, or the like. The processing element 54 may also include hardware components such as finite-state machines, sequential and combinational logic, and other electronic circuits that can perform the functions necessary for the operation of the current invention. The processing element 54 may be in electronic communication with the other electronic components through serial or parallel links that include address busses, data busses, control lines, and the like. The electronic processing element 54 may be in electrical communication with the transmitter, receiver, memory element, thermal sensor, speaker, and light. The processing element 54 may also be in electrical communication with other processing elements on other modular base units.

Figure 8:
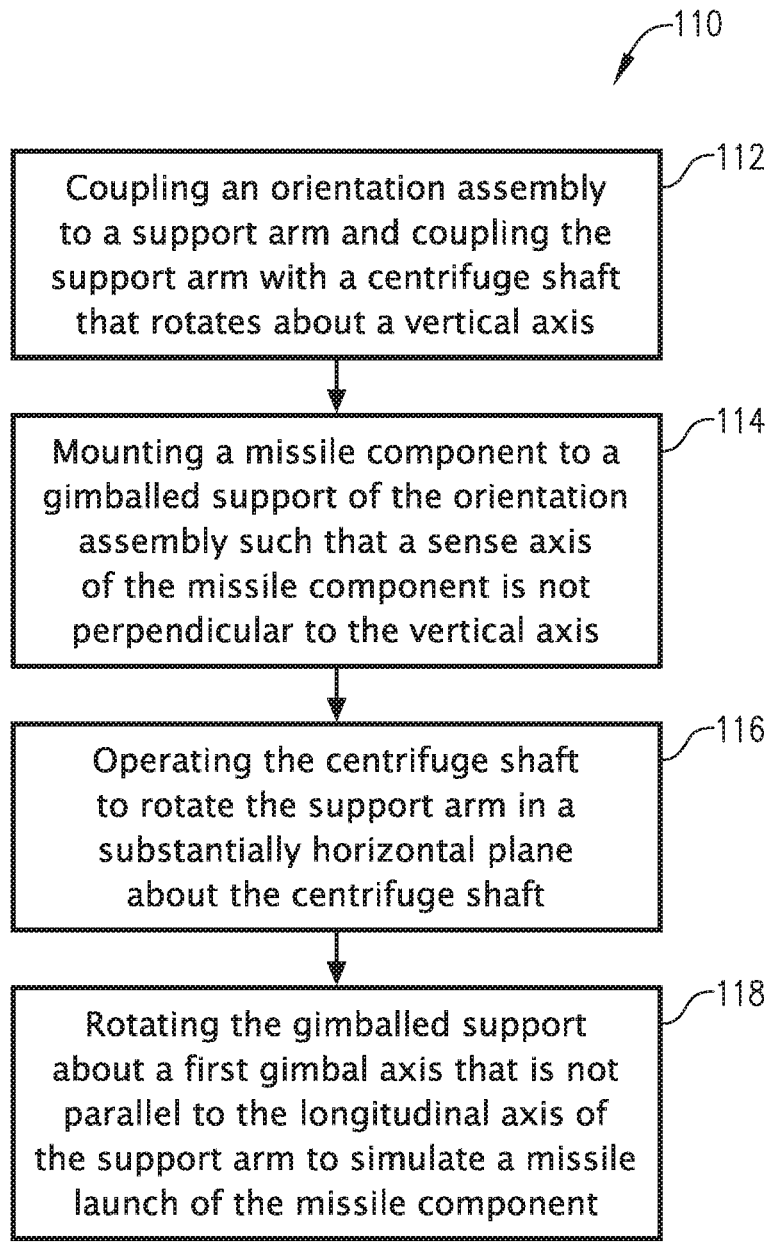
FIG. 8 is a flowchart of exemplary steps in a method for testing a missile component having a sense axis.

Referring to FIG. 8, the testing system 10 may function substantially as follows, with additional and/or alternative functionality described below in the discussion of the method. The missile component 12 is electrically connected to the electrical interface assembly 38 and may be mounted on the gimballed support 36 with the sense axis 14 parallel to the vertical axis 28 of the centrifuge shaft 24. In various embodiments, the missile component 12 may be mounted such that the sense axis 14 is not parallel to the horizontal plane in which the support arm 18 rotates. The controller 22 may operate the centrifuge motor 26 to rotate the centrifuge shaft 24, support arm 18, and orientation assembly 20A about the vertical axis 28 of the centrifuge shaft 24. The controller 22 may operate the centrifuge motor 26 to increase rate of rotation of the centrifuge shaft 24 and decrease rate of rotation of the centrifuge shaft 24 to recreate the acceleration profile of a missile and simulate a missile launch. The controller 22 may operate the first and/or second gimbal motors 31, 32 to reorient the missile component 12 to a position in which the sense axis 14 of the missile component 12 is aligned with the vector sum of acceleration vectors experienced by the missile component 12, e.g., a resultant vector of gravitational acceleration, centripetal acceleration, and tangential acceleration (See FIG. 6). For example, the controller 22 may operate the first gimbal motor 31 to rotate the first rotatable shaft about the first gimbal axis 48, which thereby rotates the first gimbal 33 about the first gimbal axis 48. Likewise, the controller 22 may operate the second gimbal motor 32 to rotate the second rotatable shaft about the second gimbal axis 50, which thereby rotates the second gimbal 34 about the second gimbal axis 50. Thus, the first and/or second gimbals 33, 34 may be rotated to reorient the missile component 12 such that the sense axis 14 aligns with the vector sum of acceleration vectors experienced by the missile component 12. The controller 22 may simultaneously operate the gimbal motors 32 to reorient the missile component 12 while also operating the centrifuge motor 26.

During testing, the controller 22 may communicate with the first and/or second resolvers 39, 40 and may receive information about a degree of rotation for the associated gimbal motors 31, 32, rotatable shaft, and/or gimbals 33, 34. The controller 22 may also communicate with the missile component 12 through the electrical interface assembly 38 and may receive information about the operation of the missile component 12 and measurements processed by the missile component 12.

The testing system 10 may include more, fewer, or alternative components and/or perform more, fewer, or alternative actions, including those discussed elsewhere herein, and particularly those discussed below in describing the method 110.

Referring again to FIG. 8, exemplary steps of a method 110 for testing a missile component having a sense axis 14 are shown. The method 110 may be implemented using the various components of the testing system 10 within the above-described exemplary operating environment. The method 110 may broadly comprise the following steps.

The orientation assembly 20A may be coupled with the support arm 18, and the support arm 18 may be coupled with the centrifuge shaft 24 that rotates about the vertical axis 28 of the centrifuge shaft 24, as shown in 112. The missile component 12 may be mounted to the gimballed support 36 of the orientation assembly 20A, as shown in 114. The missile component 12 may be mounted in a variety of alignments, and the following examples are not an exhaustive list. The missile component 12 may be mounted to the gimballed support 36 such that the sense axis 14 of the missile component 12 is vertically aligned and/or parallel with the vertical axis 28 of the centrifuge shaft 24 and/or the gravitational force. The missile component 12 may be mounted to the gimballed support 36 such that the sense axis 14 is not perpendicular to the vertical axis 28 of the centrifuge shaft 24 and/or not parallel to the horizontal plane in which the support arm 18 rotates, as shown in 114. The missile component 12 may also be mounted such that the sense axis 14 is aligned in a non-horizontal alignment that is not perpendicular to earth's gravitational force. The missile component 12 may be misaligned with earth's gravity and neither parallel nor perpendicular to earth's gravity. The missile component 12 may also be mounted such that the sense axis 14 is neither perpendicular nor parallel to the vertical axis 28 of the centrifuge shaft 24. For example, the missile component 12 may be misaligned from the vertical axis 28 such that the sense axis 14 of the missile component is within one, two, three, four, five, ten, fifteen, twenty and/or forty-five degrees of being parallel to the vertical axis 28 of the centrifuge shaft 24 or the horizontal plane in which the support arm rotates.

Figure 6:
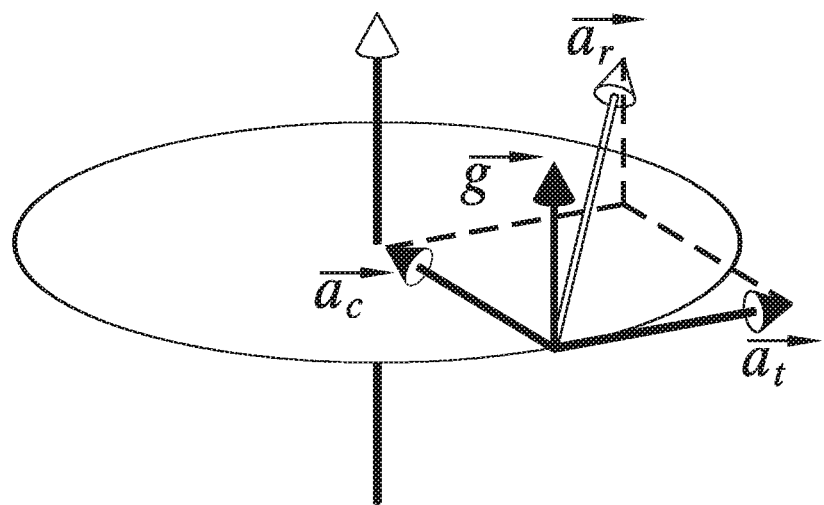
FIG. 6 is a diagram of acceleration vectors that may be experienced by the missile component undergoing testing and a resultant vector of the acceleration vectors experienced by the missile component.

After the missile component 12 has been mounted to the gimballed support, the controller 22 may operate the centrifuge motor 26 to rotate the centrifuge shaft 24 about the vertical axis 28 and may thereby rotate the connected support arm 18 in a substantially horizontal plane about the vertical axis 28 of the centrifuge shaft 24, as shown in 116. Thus, the coupled orientation assembly 20A and missile component 12 may also rotate about the vertical axis 28. The controller 22 may recreate the acceleration profile of the missile by operating the centrifuge motor 26 to increase and decrease the rate of rotation of the centrifuge shaft 24 to simulate a missile launch. The acceleration profile may be stored in the electronic memory element 52 and may be executed by the electronic processing element 54. As the centrifuge shaft 24 rotates the orientation assembly 20A and missile component 12 about the vertical axis 28, the controller 22 may operate the first and second gimbal motors 31 and 32 to rotate the associated first and second gimbals 33 and 34 to reorient the sense axis 14 of the missile component 12 to align with a vector sum of the acceleration vectors experience by the missile component 12 (See FIG. 6). For example, the sense axis 14 of the missile component 12 may be aligned with a vector sum of gravitational acceleration, tangential acceleration, and centripetal acceleration as shown in FIG. 6. The controller 22 may operate the first gimbal motor 31 and/32 to align the sense axis 14 of the missile component based on the missile acceleration profile that controls the rate of rotation for the centrifuge shaft 24.

The controller 22 may operate the first gimbal motor to rotate the first rotatable shaft and the first gimbal 33 in order to rotate the gimballed support 36 about the first gimbal axis 48 that is not parallel to the longitudinal axis 29 of the support arm 18 to simulate a missile launch of the missile component 12, as shown in 118. The first gimbal axis 48 may be a yaw axis that is substantially parallel to the vertical axis 28 of the centrifuge shaft 24. The controller 22 may operate the second gimbal motor to rotate the second rotatable shaft and the second gimbal 34 in order to rotate the gimballed support 36 about the second gimbal axis 50 that is not parallel to the vertical axis 28 of the centrifuge shaft 24. The second gimbal axis 50 may be a pitch axis that is perpendicular to both the vertical axis 28 of the centrifuge shaft 24 and the longitudinal axis 29 of the support arm. The gimbal motor(s) 31, 32 (e.g., the first and/or second motors) may be operated based on the rotation of the centrifuge shaft 24 and/or based on the acceleration profile of a missile stored in the controller 22. The gimbal motor(s) 32 may rotate the gimballed support 36 about the first and/or second gimbal axis 48, 50 such that the sense axis 14 of the missile component 12 aligns with a vector sum of acceleration vectors experienced by the missile component 12. The gimbal motor(s) 31, 32 may rotate the orientation assembly 20A about the first and/or second gimbal axis 48, 50 such that the sense axis 14 of the missile component 12 aligns with resultant vector of centripetal acceleration, tangential acceleration and gravitational acceleration experienced by the missile component 12.

In some embodiments, the missile component 12 may be misaligned to simulate a near-vertical missile launch. For example, the missile component 12 may be aligned within five degrees of being parallel to the vertical axis 28 of the centrifuge shaft 24. The controller 22 may operate the gimbal motors 32 to reorient the gimballed support 36 to align the initially misaligned sense axis 14. The misaligned sense axis 14 may be brought into alignment at a prescribed rate to be parallel with the resultant acceleration vector experienced by the missile component 12. This simulates a near vertical launch in which the guidance system of the missile corrects the flight to be true vertical again and aligned with earth's gravity and/or the acceleration vectors the missile component 12 experiences.

In another embodiment, the sense axis 14 may remain misaligned with earth's gravity and/or the vertical axis 28 throughout the centripetal acceleration testing. This simulates a near-vertical launch in which the guidance system of the missile does not reorient the missile component 12 to be aligned with earth's gravity and/or the acceleration vectors the missile component 12 experiences.

The method 110 may include more, fewer, or alternative actions, including those discussed elsewhere herein, and particularly those discussed above in describing the testing system 10.

Embodiments advantageously allow for simulating a missile launch to test a missile component 12 while mitigating uncharacteristic side-loading on the missile component 12, which is a side effect experienced in prior art centripetal acceleration testing methods. The system and method may mitigate side-loading by mounting the missile component 12 with the sense axis 14 aligned as it would be aligned in an actual launch (e.g., vertical or near-vertical), and by reorienting the sense axis 14 of the missile component based on the gravitational, tangential, and centripetal acceleration forces it experiences during centripetal acceleration testing.

Although the invention has been described with reference to the one or more embodiments illustrated in the figures, it is understood that equivalents may be employed and substitutions made herein without departing from the scope of the invention as recited in the claims.

Having thus described one or more embodiments of the invention, what is claimed as new and desired to be protected by Letters Patent includes the following:

1. A testing system for testing a missile component having a sense axis, the testing system comprising:
    a support arm for coupling with a centrifuge shaft that rotates about a vertical axis, the support arm having a longitudinal axis that is perpendicular to the vertical axis of the centrifuge shaft such that the support arm rotates in a horizontal plane about the centrifuge shaft; and
    an orientation assembly coupled to the support arm including—
        a first motor having a first rotatable shaft defining a first gimbal axis that is not parallel to the longitudinal axis of the support arm,
        a first gimbal coupled with the first rotatable shaft so as to rotate about the first gimbal axis while the support arm is rotated by the centrifuge shaft such that missile component is simultaneously rotated about both the vertical axis of the centrifuge shaft and the first gimbal axis to simulate a missile launch of the missile component, and
        a gimballed support coupled with the first gimbal for supporting the missile component such that the sense axis of the missile component is not parallel to the horizontal plane.

2. The testing system of claim 1, wherein the orientation assembly further includes:
    a second motor having a second rotatable shaft defining a second gimbal axis that is not parallel to the vertical axis of the centrifuge shaft, and
    a second gimbal coupled with the second rotatable shaft so as to rotate about the second gimbal axis while the support arm is rotated by the centrifuge shaft such that missile component is simultaneously rotated about the vertical axis of the centrifuge shaft, the first gimbal axis, and the second gimbal axis.

3. The testing system of claim 1, wherein the orientation assembly further includes an electrical interface assembly positioned on the gimballed support for electrically connecting with the missile component.

4. The testing system of claim 1, wherein the first gimbal axis is a yaw axis that is parallel to the vertical axis of the centrifuge.

5. The testing system of claim 2, wherein the second gimbal axis is a pitch axis that is perpendicular to both the longitudinal axis of the support arm and the vertical axis of the centrifuge shaft.

6. The testing system of claim 1, wherein the missile component is supported on the gimballed support such that the sense axis of the missile component is parallel to the vertical axis of the centrifuge shaft.

7. The testing system of claim 1, wherein the first motor rotates the first rotatable shaft to align the sense axis of the missile component with a vector sum of acceleration vectors experienced by the missile component while the missile component is rotated about the vertical axis of the centrifuge shaft.

8. The testing system of claim 2, wherein the first and second motors respectively rotate the first and second rotatable shafts to cooperatively align the sense axis of the missile component with a vector sum of acceleration vectors experienced by the missile component while the missile component is rotated about the vertical axis of the centrifuge shaft.

9. The testing system of claim 1, wherein the centrifuge shaft rotates about the vertical axis at a rate of rotation, the rate of rotation increasing and decreasing so as to simulate a missile launch of the missile component.

10. A method for testing a missile component having a sense axis, the method comprising the steps of:
    coupling an orientation assembly to a support arm and coupling the support arm with a centrifuge shaft that rotates about a vertical axis;
    mounting the missile component to a gimballed support of the orientation assembly such that the sense axis of the missile component is not perpendicular to the vertical axis;
    operating the centrifuge shaft to rotate the support arm in a horizontal plane about the centrifuge shaft; and
    rotating the gimballed support about a first gimbal axis that is not parallel to the longitudinal axis of the support arm to simulate a missile launch of the missile component.

11. The method of claim 10, further including the step of rotating the gimballed support about a second gimbal axis that is not parallel to the vertical axis of the centrifuge shaft.

12. The method of claim 10, wherein the first gimbal axis is a yaw axis that is parallel to the vertical axis of the centrifuge shaft.

13. The method of claim 11, wherein the second gimbal axis is a pitch axis that is perpendicular to both the vertical axis of the centrifuge shaft and the longitudinal axis of the support arm.

14. The method of claim 10, further including the step of recreating a missile acceleration profile by increasing and decreasing a rate of rotation of the centrifuge shaft about the vertical axis.

15. The method of claim 10, wherein the step of mounting the missile component includes mounting the missile component such that the sense axis of the missile component is parallel to the vertical axis.

16. The method of claim 10, wherein the step of mounting the missile component includes mounting the missile component such that the sense axis of the missile component is neither parallel nor perpendicular to the vertical axis.

17. The method of claim 14, wherein the step of rotating the gimballed support about the first gimbal axis includes rotating the gimballed support to align the sense axis of the missile component based on the rate of rotation of the centrifuge shaft.

18. The method of claim 10, further including the step of rotating the gimballed support such that the sense axis of the missile component aligns with a vector sum of acceleration vectors experienced by the missile component.

19. The method of claim 11, wherein the steps of rotating gimballed support about the first gimbal axis and the second gimbal axis include rotating the gimballed support such that the sense axis of the missile component aligns with resultant vector of centripetal acceleration, tangential acceleration and gravitational acceleration experienced by the missile component.

20. A testing system for testing a first missile component having a first sense axis and a second missile component having a second sense axis, the testing system comprising:
    a support arm for coupling with a centrifuge shaft that rotates about a vertical axis, the support arm having a longitudinal axis that is perpendicular to the vertical axis of the centrifuge shaft such that the support arm rotates in a horizontal plane about the centrifuge shaft, the support arm including a first end and a second end;
    a first orientation assembly coupled to the first end of the support arm and including—
        a first motor having a first rotatable shaft defining a first gimbal axis that is not parallel to the longitudinal axis of the support arm,
        a first gimbal coupled with the first rotatable shaft so as to rotate about the first gimbal axis while the support arm is rotated by the centrifuge shaft such that the first missile component is simultaneously rotated about both the vertical axis of the centrifuge shaft and the first gimbal axis to simulate a missile launch of the missile component, and
        a first gimballed support coupled with the first gimbal for supporting the first missile component such that the first sense axis of the first missile component is not parallel to the horizontal plane; and
    a second orientation assembly coupled to the second end of the support arm and including—
        a second motor having a second rotatable shaft defining a second gimbal axis that is not parallel to the longitudinal axis of the support arm,
        a second gimbal coupled with the second rotatable shaft so as to rotate about the second gimbal axis while the support arm is rotated by the centrifuge shaft such that the second missile component is simultaneously rotated about both the vertical axis of the centrifuge shaft and the second gimbal axis to simulate a missile launch of the second missile component, and
        a second gimballed support coupled with the second gimbal for supporting the second missile component such that the second sense axis of the second missile component is not parallel to the horizontal plane.

* * * * *